(12) United States Patent
Creek et al.

(10) Patent No.: US 10,240,638 B2
(45) Date of Patent: Mar. 26, 2019

(54) CARTRIDGE BEARING WITH BEARING GREASE SETTING MEMBER

(71) Applicant: GM GLOBAL TECHNOLOGY OPERATIONS LLC, Detroit, MI (US)

(72) Inventors: Steven W. Creek, Shelby Township, MI (US); Larry C. Williams, South Lyon, MI (US); John M. Lopez, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/662,383

(22) Filed: Jul. 28, 2017

(65) Prior Publication Data

US 2019/0032719 A1    Jan. 31, 2019

(51) Int. Cl.
| | |
|---|---|
| *F16C 19/06* | (2006.01) |
| *F16C 33/78* | (2006.01) |
| *F16C 33/66* | (2006.01) |
| *F16C 43/04* | (2006.01) |
| *F16J 15/00* | (2006.01) |
| *F16J 15/32* | (2016.01) |
| *F16J 15/3204* | (2016.01) |

(52) U.S. Cl.
CPC ......... *F16C 33/7866* (2013.01); *F16C 19/06* (2013.01); *F16C 33/6622* (2013.01); *F16C 33/782* (2013.01); *F16C 33/7806* (2013.01); *F16C 33/7826* (2013.01); *F16C 33/7896* (2013.01); *F16C 43/04* (2013.01); *F16J 15/002* (2013.01); *F16J 15/3204* (2013.01); *F16C 2361/31* (2013.01)

(58) Field of Classification Search
CPC .. F16C 19/06; F16C 33/6607; F16C 33/6622; F16C 33/6659; F16C 33/6674; F16C 33/7806; F16C 33/7823; F16C 33/7826; F16C 33/784; F16C 33/7866; F16C 33/796; F16C 2361/31; F16C 15/32; F16C 33/7896; F16J 15/002; F16J 15/3204; F16J 15/3448
USPC ....... 384/474, 475, 477, 482–484, 486, 469, 384/589, 489; 277/349, 402, 541, 562
See application file for complete search history.

(56) References Cited

U.S. PATENT DOCUMENTS 1,910,061 A * 5/1933 Schatz ............... F16C 33/7859
                                                              277/423
2,110,864 A * 3/1938 Batesole ............ F16C 33/7846
                                                              277/412

(Continued)

FOREIGN PATENT DOCUMENTS

JP          07293707 A  * 11/1995  ............... F16J 15/34
JP       2006183712 A  *  7/2006  ............. F16C 33/78

*Primary Examiner* — Marcus Charles

(57) ABSTRACT

A bearing assembly for a vehicle includes an inner race having an interior surface and an exterior surface, an outer race having an interior surface and an exterior surface, a first sealing member disposed between the inner race and the outer race, the first sealing member having a sealing surface adjacent to the interior surface of the outer race, and a second sealing member disposed radially inward of the first sealing member and adjacent to a shoulder surface of the outer race, wherein the first sealing member permits grease bleed-off from the bearing prior to the first sealing member setting against the second sealing member.

17 Claims, 4 Drawing Sheets

(56) References Cited

U.S. PATENT DOCUMENTS

| | | | | | |
|---|---|---|---|---|---|
| 2,353,988 | A | * | 7/1944 | Batesole | F16C 23/086 |
| | | | | | 277/380 |
| 2,917,328 | A | * | 12/1959 | Peterson | F16C 33/7859 |
| | | | | | 277/420 |
| 3,314,735 | A | * | 4/1967 | Kocian | F16C 23/084 |
| | | | | | 384/475 |
| 3,869,181 | A | * | 3/1975 | Barber | F16C 23/086 |
| | | | | | 277/349 |
| 4,249,782 | A | * | 2/1981 | Frank | A01B 71/04 |
| | | | | | 384/147 |
| 5,927,864 | A | * | 7/1999 | Feerick | F16C 23/084 |
| | | | | | 384/482 |
| 8,167,500 | B2 | * | 5/2012 | Furukawa | F16C 19/386 |
| | | | | | 277/345 |
| 9,157,475 | B2 | * | 10/2015 | Gutowski | F16C 23/084 |
| 9,284,984 | B2 | * | 3/2016 | Katsaros | F16C 33/6648 |
| 9,488,227 | B2 | * | 11/2016 | Moratz | F16C 33/7859 |
| 2012/0321489 | A1 | * | 12/2012 | Murakami | F04D 29/106 |
| | | | | | 417/364 |
| 2016/0076595 | A1 | * | 3/2016 | Moratz | F16C 33/7859 |
| | | | | | 384/479 |
| 2017/0146066 | A1 | * | 5/2017 | Little | F16C 33/7896 |

\* cited by examiner

DETAIL 3-3

CARTRIDGE BEARING WITH BEARING GREASE SETTING MEMBER

INTRODUCTION

The present invention relates generally to the field of vehicles and, more specifically, to a cartridge bearing with a bearing grease setting member.

Bearings constrain the relative motion between two or more parts to only desired types of motion. Rolling-element bearings carry a load by placing round or conical elements between the two parts or pieces. The relative motion of the pieces causes the round elements to roll, which may reduce or limit rolling resistance between the two pieces.

Current cartridge bearings used on propshafts have a rubber interface on the static side of the seal to prevent corrosion ingress into the bearing. This rubber interface is difficult to place in the proper location during the assembly of the bearing seals.

SUMMARY

Embodiments according to the present disclosure provide a number of advantages. For example, embodiments according to the present disclosure enable use of a conventional pressfit interface between the seal can and the bearing outer race, but sealing this interface is done with "O" ring sealing to prevent corrosion on the static seal interface. The use of "O" rings to seal the static side of a sealed ball bearing allows maximum retention force on the static seal side with the metal interference while sealing the corrosion with the "O" ring and allowing grease to "bleed off" the bearing. This "bleed off" is controlled by accurately controlling the seating position of the grease setting member.

Embodiments according to the present disclosure also use a metal-to-metal interface between the seal can and the outer race to correctly position the rubber-bonded seal in the bearing. Additionally, embodiments according to the present disclosure provide increased retention force of the can to the outer race. The use of "O" ring sealing provides dual protection on the static side of the seal at both the top and bottom surfaces. Furthermore, embodiments according to the present disclosure provide installation benefits as the "O" rings are set in place at their respective locations in the outer race prior to seal installation and the elimination of the rubber surface bond to the static side of the seal allows the installation tool to press on a solid metal surface versus pressing through a rubber interface.

In one aspect, a bearing is rotatable about a bearing axis and defines a center plane. The bearing includes an inner race having an interior surface and an exterior surface, an outer race having an interior surface and an exterior surface, a first sealing member disposed between the inner race and the outer race, the first sealing member having a sealing surface adjacent to the interior surface of the outer race, and a second sealing member disposed radially inward of the first sealing member and adjacent to a shoulder surface of the outer race. The first sealing member permits grease bleed-off from the bearing prior to the first sealing member setting against the second sealing member.

In some aspects, the exterior surface of the outer race is coupled to a stationary housing and the exterior surface of the inner race is coupled to a rotating shaft.

In some aspects, the first sealing member is a grease setting member.

In some aspects, the first sealing member has a metal-to-metal interface with the interior surface of the outer race.

In some aspects, the second sealing member is an o-ring.

In some aspects, the first sealing member and the interior surface of the outer race define a groove through which grease passes as the first sealing member seats against the second sealing member, and the groove is sealed when the first sealing member seats against the second sealing member.

In some aspects, the bearing further includes a third sealing member extending between the inner race and the outer race, wherein the third sealing member is radially outward of the first and second sealing members.

In some aspects, the bearing further includes a fourth sealing member radially outward of the second sealing member, the fourth sealing member adjacent to the sealing surface of the first sealing member, wherein the fourth sealing member is an o-ring that interfaces with the interior surface of the outer race.

In another aspect, a cartridge bearing assembly for a propshaft of an automotive vehicle includes a ball bearing in a bearing housing, an inner race having an interior surface adjacent to the ball bearing and an exterior surface coupled to the propshaft, an outer race having an interior surface adjacent to the ball bearing and an exterior surface, a first sealing member disposed between the inner race and the outer race, the first sealing member having a sealing surface adjacent to the interior surface of the outer race, and a second sealing member disposed radially inward of the first sealing member and adjacent to a shoulder surface of the outer race. The first sealing member and the interior surface of the outer race define a groove and the groove is sealed when the first sealing member seats against the second sealing member.

In some aspects, the first sealing member is a grease setting member.

In some aspects, the groove permits a release of grease from the bearing assembly until the first sealing member seats against the second sealing member to prevent an ingress of contaminants to the ball bearing.

In some aspects, the first sealing member has a metal-to-metal interface with the interior surface of the outer race.

In some aspects, the second sealing member is an o-ring.

In some aspects, the cartridge bearing assembly further includes a third sealing member extending between the inner race and the outer race, wherein the third sealing member is radially outward of the first and second sealing members.

In some aspects, the cartridge bearing assembly further includes a fourth sealing member radially outward of the second sealing member, the fourth sealing member adjacent to the sealing surface of the first sealing member, wherein the fourth sealing member is an o-ring that interfaces with the interior surface of the outer race.

In some aspects, the first sealing member includes a first leg extending radially parallel to the interior surface of the outer race and a second leg perpendicular to and radially outward of the first leg, wherein the first leg includes the sealing surface and at least a portion of the second leg extends above the sealing surface towards the interior surface of the outer race.

In yet another aspect, a propshaft bearing assembly for a vehicle includes a shaft rotatable about an axis, a bearing rotatable about the axis, wherein the bearing defines a center plane and includes an inner race having an interior surface and an exterior surface coupled to the propshaft, an outer race having an interior surface and an exterior surface, a first sealing member disposed between the inner race and the outer race, the first sealing member having a sealing surface adjacent to the interior surface of the outer race such that the sealing surface and the interior surface form a groove, a second sealing member disposed radially inward of the first sealing member, a third sealing member radially outward of the first and second sealing members, and a flange disposed radially outward of the third sealing member.

In some aspects, the propshaft bearing assembly further includes a fourth sealing member radially outward of the second sealing member, the fourth sealing member adjacent to the sealing surface of the first sealing member, wherein the fourth sealing member is an o-ring that interfaces with the interior surface of the outer race.

In some aspects, wherein the first sealing member includes a first leg extending radially parallel to the interior surface of the outer race and a second leg perpendicular to and radially outward of the first leg, wherein the first leg includes the sealing surface and at least a portion of the second leg extends above the sealing surface towards the interior surface of the outer race.

BRIEF DESCRIPTION OF THE DRAWINGS

The present disclosure will be described in conjunction with the following figures, wherein like numerals denote like elements.

Figure 1:
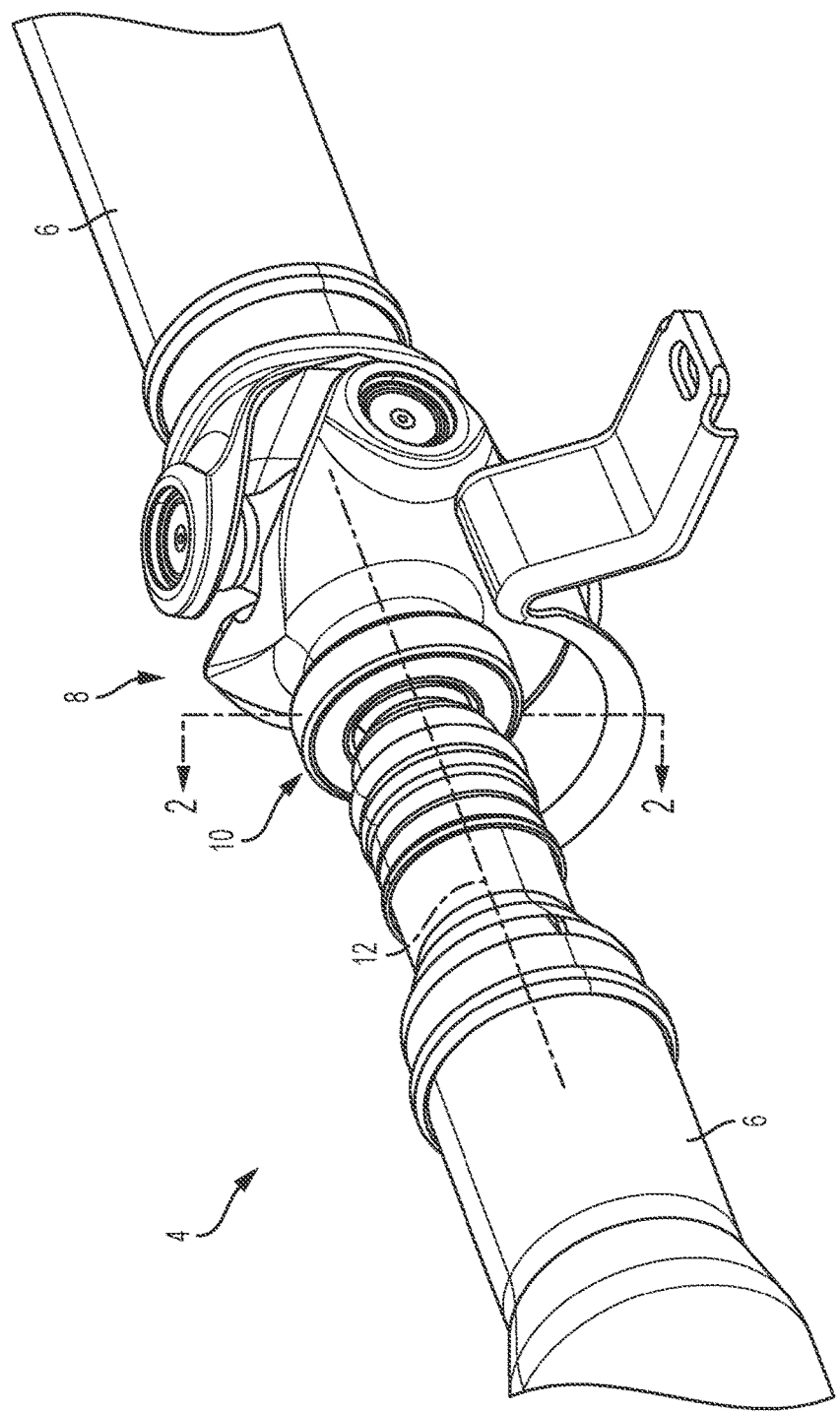
FIG. 1 is a schematic, isometric view of a bearing assembly, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right" "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

For improved corrosion-resistant center bearings, some embodiments utilize cartridge sealing technology versus lip sealing. However, challenges exist in designing such a seal in the confined package space of the bearing. The leak path for grease from the bearing passes not only through the cartridge seal dynamic interface but also through the backside static interface between the seal and the outer race. The current rubber bonding on the seal that fits to the static surface is difficult to hold in position. Embodiments discussed herein utilize a direct steel interface of the seal can to the outer race. In some embodiments, the sealing of this interface is done by means of an "o" ring at the base of the seal can at the ball bearing interface and, in some embodiments, a separate "o" ring at the outer edge of the race to the seal can interface.

FIG. 1 shows an isometric view of a cartridge bearing assembly for a vehicle (not shown). The bearing assembly 4 may be supportive of a shaft 6, which may be a portion of a propeller shaft (propshaft) or another exposed, rotating shaft. A stationary housing 8 supports a bearing 10 relative to the vehicle. The bearing 10 allows the shaft 6 to rotate relative to the housing 8 and the vehicle. The bearing 10 rotates about a bearing axis 12, which is substantially coaxial with the shaft 6 and represents a longitudinal axis in cylindrical coordinate systems. In some vehicles, multiple bearings 10 may be used to facilitate rotation of more than two shafts 6.

Figure 2:
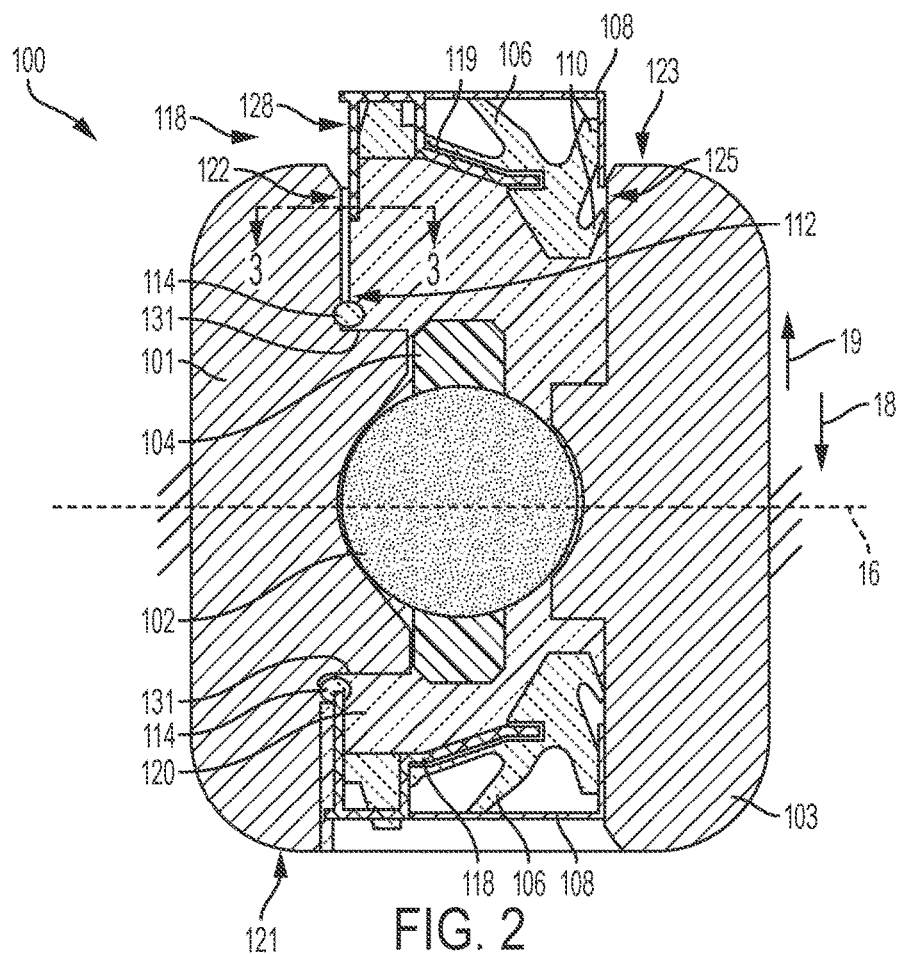
FIG. 2 is a schematic, cutaway view of a bearing from the bearing assembly, taken along line 2-2 of FIG. 1, before assembly is completed, according to an embodiment.

With reference to FIG. 2, a cutaway view of a bearing 100 is shown, taken generally along a line 2-2 of FIG. 1. The bearing 100 may be used with the bearing assembly 4 shown in FIG. 1. A center plane 16 bisects the bearing 100, which is symmetric about the center plane 16. However, the bearing 100 is not required to be symmetric. Furthermore, the housing, casing, or other support structure surrounding the bearing 100 may be asymmetric or symmetric, regardless of the symmetry of the bearing 100. Because the bearing 100 shown is symmetric, it may be installed into the housing in either direction.

An interior direction 18 represents movement or elements toward the center plane 16, and an exterior direction 19 represents movement or elements away from the center plane 16. Movement or relative position in the interior direction 18 is proximal to the center plane 16 and movement or relative position in the exterior direction 19 is distal to the center plane 16.

The bearing 100 includes one or more ball bearings 102. The ball bearings 102 carry the rotation and bear the friction caused by relative rotation between the shaft 6 and the housing 8. Alternatively, the bearing 100 may have pins or other friction carriers. The interior direction 18 points toward the ball bearings 102. The center plane 16 is substantially aligned with the ball bearing 102, but the center plane 16 may also align with, or bisect, one or more sets of pins.

An inner race 103 of the bearing 100 is in contact with, and generally rotates in common with, the shaft 6 (not shown in FIG. 2). The inner race 103 defines an exterior surface 123, which is distal to the center plane 16 and is the same on both sides when the bearing 100 is symmetric. Note that the bearing 100 is not required to be symmetric, and any of the features, elements, and limitations described herein may be on only one side of the bearing 100.

An outer race 101 is radially outward from the inner race 103 relative to the axis 12. The outer race 101 defines an exterior surface 121, which is distal to the center plane 16 and is the same on both sides when the bearing 100 is symmetric. The inner race 103 and the outer race 101 are substantially coaxial with, and rotatable about, the axis 12.

The ball bearings 102 roll between the inner race 103 and the outer race 101, although there may be intermediary components, such as friction-reducing linings. Grease or other lubricating media 120 may coat the ball bearings 102 and the interfaces with the inner race 103 and the outer race 101.

In some embodiments, the bearings 102 are enclosed within a bearing cage 104. At least one seal 106 substantially spans the gap between the inner race 103 and the outer race 101. The seal 106, or seals 106, prevent the ingress of, for example and without limitation, dust, debris, or moisture to the ball bearings 102. The seal 106 may include features to increase the path distance required for foreign material to move from the exterior to the interior of the seal 106, and may be formed from rubber or another suitable material. The seal 106 includes one or more lip seals 110 configured to interface with an outer surface 125 of the inner race 103.

Figure 4:
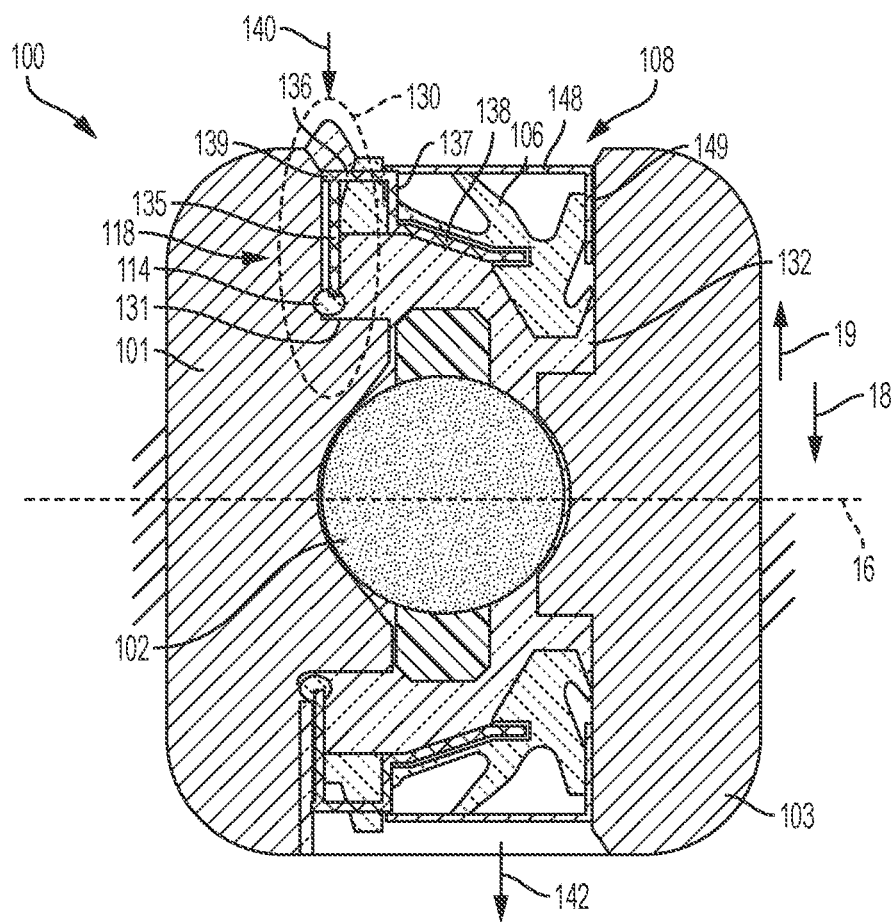
FIG. 4 is a schematic, cutaway view of the bearing of FIG. 2, after assembly is complete, according to an embodiment.
Figure 5:
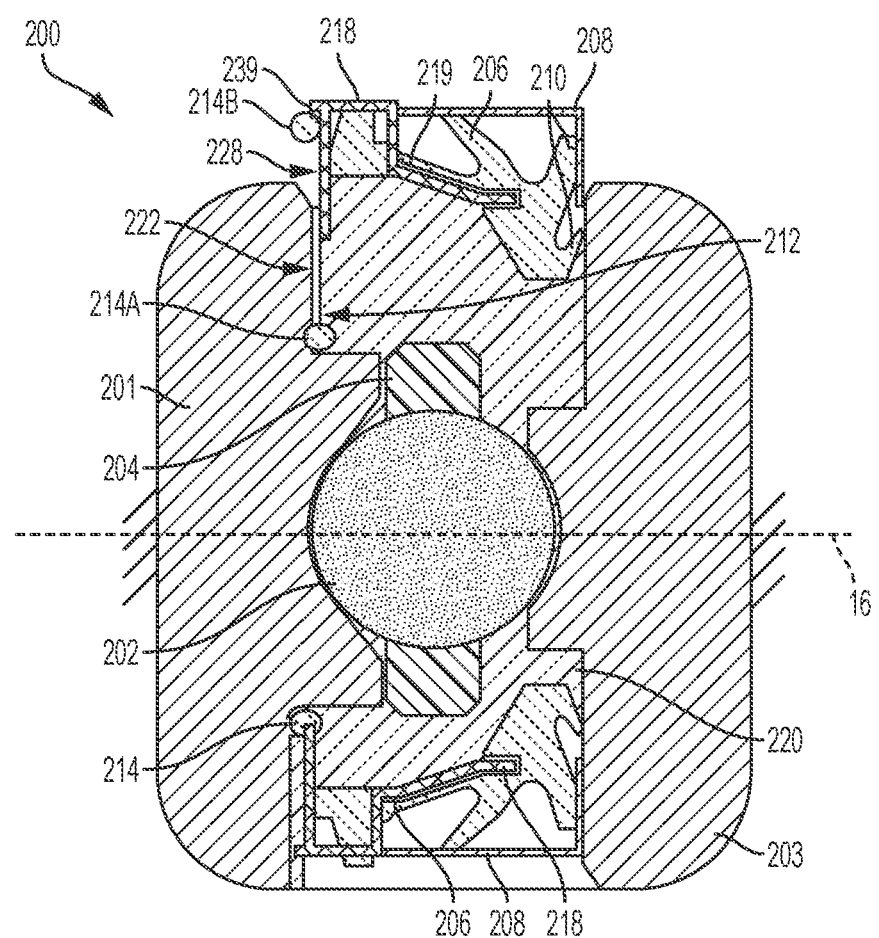
FIG. 5 is a schematic, cutaway view of a bearing of the bearing assembly, according to an embodiment.

The bearing 100 also includes a seal 118. The seal 118 is, in some embodiments, a metal-backed seal having a sealing surface 128 adjacent to an interior surface 122 of the outer race 101. In some embodiments, the seal 118 has a shape similar to the numeral seven (7). With reference to FIG. 4, the seal 118 includes a first leg 135. The first leg 135 extends radially parallel to the interior surface 122 of the outer race 101 and includes the sealing surface 128. The first leg 135 is connected to one end of a second leg 136 that extends generally perpendicular to the first leg 135. The second leg 136 is radially outward of the first leg 135. At least a portion of the second leg 136 extends above the sealing surface 128 of the first leg 135 and towards the outer race 101. As shown in FIG. 5 and discussed further herein, the portion 139 of the leg 136 helps to locate and position a sealing member, such as an o-ring.

The seal 118 further includes a third leg 137 coupled to second leg 136 at a second end opposite the first end. The third leg 137 extends substantially parallel to the first leg 135. An angled leg 138 extends from the third leg 137. The angled leg 138 is radially inward of the second leg 136. In some embodiments, an adhesive layer 119 (shown in FIG. 2) couples the seal 118 to the seal 106. In some embodiments, there is not an adhesive layer on the sealing surface 128.

In some embodiments, the bearing 100 includes a flange 108 that acts like a sealing slinger. The flange 108 is radially outward from the seal 118 and the seal 106. The flange 108 includes a first leg 148 that extends parallel with the plane 16 and a second leg 149 oriented substantially perpendicular to the first leg 148. In some embodiments, the flange 108 is installed with the seals 106, 118, as discussed below, and provides additional protection for the bearing 100 against corrosive elements. The internal slinger 108 rotates at the same speed as the shaft 6. In some embodiments, the face of the flange 108 is made of steel and includes a thin sealed crevice.

Figure 3:
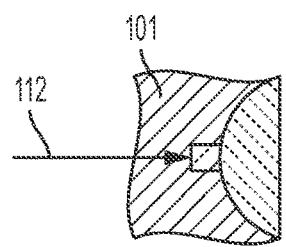
FIG. 3 is a schematic partial view of a grease bleed groove of the bearing assembly of FIG. 2 taken along line 3-3 of FIG. 2, according to an embodiment.

As shown in FIGS. 2 and 3, in some embodiments, the sealing surface 128 and the interior surface 122 of the outer race 101 define a groove 112. The groove 112 permits grease bleed-off from the bearing, lowering the hydraulic pressure within the bearing 100. As a result of the lower hydraulic pressure, the seal 106 is less pressurized and grease does not substantially fill the gaps between the seal lips 110 and the inner race 103. The reduction in pressure on the seals 106, 118 prevents undesirable movement of the seals 106, 118 in the radially outward direction 19, lowering the occurrence of seal "pop out" while pinching off the flow of grease with a substantially air-tight seal established during the final stage of seal insertion.

A second sealing member 114 is disposed radially inward of the seal 118 and adjacent to a shoulder surface 131 of the outer race 101. In some embodiments, the second sealing member 114 is an o-ring. The o-ring 114 seals the static interface between the outer race 101 and the seal 118. The o-ring 114 seals the bearing 100 from incoming corrosion hazards, such as, for example and without limitation, water, debris, etc.

As shown in FIG. 4, area 130 illustrates the grease bleed-off that occurs when radial pressure 140 is applied to the seal 118 during assembly. As the seal 118 moves radially inward in the direction 18, excess grease 132 passes through the groove 112 between the sealing surface 128 and the surface 122. Pressure 140 is applied to the seal 118 until the seal 118 seats against the o-ring 114, effectively sealing the bearing 100 against corrosive elements. Thus, a pressfit interface is established between the seal 118 and the outer race 101, but sealing the interface is accomplished through o-ring sealing to prevent corrosion on the static seal interface. The pressfit interface in combination with o-ring sealing results in maximum retention force on the static seal side with the metal interference while sealing against corrosion via the o-ring sealing. Additionally, the pressfit interface replaces a more expensive and time consuming position verification check during manufacture, resulting in increased cost savings.

Referring now to FIG. 5, and with continued reference to FIGS. 1-4, there is shown a schematic, cutaway view of a bearing 200, which may be used in a manner similar to the bearing 100 shown in FIG. 2. FIG. 5 is taken from a similar viewpoint to FIG. 2, and the bearing 200 may be used with the shaft 6 and housing 8 or similar components. Directional and geometric references may be used interchangeably between FIGS. 2 and 5. Some features of the bearing 200 shown in FIG. 5 may not be separately numbered but correspond to features shown and discussed in relation to FIGS. 2-4.

In the bearing 200, one or more ball bearings 202 ride between an outer race 201 and an inner race 203. The outer race 201 is radially outward from the inner race 203 relative to an axis (not shown) of the bearing 200.

An inner race 203 of the bearing 200 is in contact with, and generally rotates in common with, the shaft 6 (not shown in FIG. 5). An outer race 201 is radially outward from the inner race 203 relative to the axis 12. The inner race 103 and the outer race 101 are substantially coaxial with, and rotatable about, the axis 12.

The ball bearings 202 roll between the inner race 203 and the outer race 201, although there may be intermediary components, such as friction-reducing linings. Grease or other lubricating media 220 may coat the ball bearings 202 and the interfaces with the inner race 203 and the outer race 201.

In some embodiments, the bearings 202 are enclosed within a bearing cage 204. At least one seal 206 substantially spans the gap between the inner race 203 and the outer race 201. The seal 206, or seals 206, prevent the ingress of, for example and without limitation, dust, debris, or moisture to the ball bearings 202. The seal 206 may include features to increase the path distance required for foreign material to move from the exterior to the interior of the seal 206, and may be formed from rubber or another suitable material. The seal 206 includes one or more seal lips 210 configured to interface with an outer surface of the inner race 203.

The bearing 200 also includes a seal 218. The seal 218 is, in some embodiments, a metal-backed seal similar to the seal 118 discussed herein. The seal 218 has a sealing surface 228 adjacent to an outer surface 222 of the outer race 201. In some embodiments, the seal 218 has a shape similar to the numeral seven (7). The seal 218 includes an adhesive layer 219 to couple the seal 218 to the seal 206. In some embodiments, there is not an adhesive layer on the sealing surface 228.

Similar to the seal 118 discussed herein, a groove 212 is defined by the outer surface 222 of the outer race 201 and the seal 218. The groove 212 permits grease bleed-off from the bearing, lowering the hydraulic pressure within the bearing 200. As a result of the lower hydraulic pressure, the seal 206 is less pressurized and grease does not substantially fill the gaps between the seal lips 210 and the inner race 203. The reduction in pressure on the seals 206, 218 prevents undesirable movement of the seals 206, 218 in the radially outward direction, lowering the occurrence of seal "pop out" while pinching off the flow of grease with a substantially air-tight seal established during the final stage of seal insertion.

Similar to the sealing member 114, a second sealing member 214A is disposed radially inward of the seal 218 and adjacent to a shoulder surface 231 of the outer race 201. In some embodiments, the second sealing member 214A is an o-ring. The second sealing member 214A seals the static interface between the outer race 201 and the seal 218. The second sealing member 214A seals the bearing 200 from incoming corrosion hazards, such as, for example and without limitation, water, debris, etc.

In some embodiments, as shown in FIG. 5, a third sealing member 214B is disposed radially outward of the second sealing member 214A. The third sealing member 214B is adjacent to the sealing surface 228 and is positioned near the portion 239 of the seal 218 such that the portion 239 is radially outward of the third sealing member 214B. In some embodiments, the third sealing member 214B is an o-ring. The third sealing member 214B, along with the second sealing member 214A, seals the bearing 200 from incoming corrosion hazards.

While the present invention may be described with respect to automotive or vehicular applications, those skilled in the art will recognize the broader applicability of the invention. It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A bearing rotatable about a bearing axis and defining a center plane, comprising:
    an inner race having an interior surface and an exterior surface;
    an outer race having an interior surface and an exterior surface;
    a first sealing member disposed between the inner race and the outer race, the first sealing member having a sealing surface adjacent to the interior surface of the outer race; and
    a second sealing member disposed radially inward of the first sealing member and adjacent to a shoulder surface of the outer race;
    wherein the first sealing member permits grease bleed-off from the bearing prior to the first sealing member setting against the second sealing member; and
    wherein the first sealing member comprises a first leg extending radially parallel to the interior surface of the outer race and a second leg perpendicular to and radially outward of the first leg, and the first leg includes the sealing surface and at least a portion of the second leg extends above the sealing surface towards the interior surface of the outer race.

2. The bearing of claim 1, wherein the exterior surface of the outer race is coupled to a stationary housing and the exterior surface of the inner race is coupled to a rotating shaft.

3. The bearing of claim 1, wherein the first sealing member is a grease setting member.

4. The bearing of claim 1, wherein the first sealing member has a metal-to-metal interface with the interior surface of the outer race.

5. The bearing of claim 1, wherein the second sealing member is an o-ring.

6. The bearing of claim 1, wherein the first sealing member and the interior surface of the outer race define a groove through which grease passes as the first sealing member seats against the second sealing member, and the groove is sealed when the first sealing member seats against the second sealing member.

7. The bearing of claim 1 further comprising a third sealing member extending between the inner race and the outer race, wherein the third sealing member includes at least one lip seal that interfaces with the exterior surface of the inner race.

8. The bearing of claim 1 further comprising an additional sealing member radially outward of the second sealing member, the additional sealing member adjacent to the sealing surface of the first sealing member, wherein the additional sealing member is an o-ring that interfaces with the interior surface of the outer race.

9. A cartridge bearing assembly for a propshaft of an automotive vehicle, comprising:
    a ball bearing in a bearing housing;
    an inner race having an interior surface adjacent to the ball bearing and an exterior surface coupled to the propshaft;
    an outer race having an interior surface adjacent to the ball bearing and an exterior surface;
    a first sealing member disposed between the inner race and the outer race, the first sealing member having a sealing surface adjacent to the interior surface of the outer race; and
    a second sealing member disposed radially inward of the first sealing member and adjacent to a shoulder surface of the outer race;
    wherein the first sealing member and the interior surface of the outer race define a groove and the groove is sealed when the first sealing member seats against the second sealing member and the first sealing member comprises a first leg extending radially parallel to the interior surface of the outer race and a second leg perpendicular to and radially outward of the first leg, and the first leg includes the sealing surface and at least a portion of the second leg extends above the sealing surface towards the interior surface of the outer race.

10. The cartridge bearing assembly of claim 9, wherein the first sealing member is a grease setting member.

11. The cartridge bearing assembly of claim 10, wherein the groove permits a release of grease from the bearing assembly until the first sealing member seats against the second sealing member to prevent an ingress of contaminants to the ball bearing.

12. The cartridge bearing assembly of claim 9, wherein the first sealing member has a metal-to-metal interface with the interior surface of the outer race.

13. The cartridge bearing assembly of claim 9, wherein the second sealing member is an o-ring.

14. The cartridge bearing assembly of claim 9 further comprising a third sealing member extending between the inner race and the outer race, wherein the third sealing member includes at least one lip seal that interfaces with the exterior surface of the inner race.

15. The cartridge bearing assembly of claim 9 further comprising an additional sealing member radially outward of the second sealing member, the additional sealing member adjacent to the sealing surface of the first sealing member, wherein the additional sealing member is an o-ring that interfaces with the interior surface of the outer race.

16. A propshaft bearing assembly for a vehicle, comprising:
    a shaft rotatable about an axis;

a bearing rotatable about the axis, wherein the bearing defines a center plane and comprises
an inner race having an interior surface and an exterior surface coupled to the propshaft;
an outer race having an interior surface and an exterior surface;
a first sealing member disposed between the inner race and the outer race, the first sealing member having a first leg extending radially parallel to the interior surface of the outer race and a second leg perpendicular to and radially outward of the first leg, the first leg including a sealing surface adjacent to the interior surface of the outer race such that the sealing surface and the interior surface form a groove and at least a portion of the second leg extends above the sealing surface towards the interior surface of the outer race;
a second sealing member disposed radially inward of the first sealing member;
a third sealing member extending between the inner race and the outer race and including at least one lip seal that interfaces with the exterior surface of the inner race; and
a flange disposed radially outward of the third sealing member.

17. The propshaft bearing assembly of claim 16 further comprising an additional sealing member radially outward of the second sealing member, the additional sealing member adjacent to the sealing surface of the first sealing member, wherein the additional sealing member is an o-ring that interfaces with the interior surface of the outer race.

* * * * *